April 17, 1951 W. L. CARLSON 2,549,423

REDUCTION OF SELECTIVE FADING DISTORTION

Original Filed Sept. 22, 1943

INVENTOR
WENDELL L. CARLSON.
BY H. S. Grover
ATTORNEY

Patented Apr. 17, 1951

2,549,423

UNITED STATES PATENT OFFICE 2,549,423

REDUCTION OF SELECTIVE FADING DISTORTION

Wendell L. Carlson, Princeton, N. J., assignor to Radio Corporation of America, a corporation of Delaware Original application September 22, 1943, Serial No. 503,465, now Patent No. 2,413,543, dated December 31, 1946. Divided and this application September 20, 1945, Serial No. 617,587

3 Claims. (Cl. 250—6)

Figure 1:
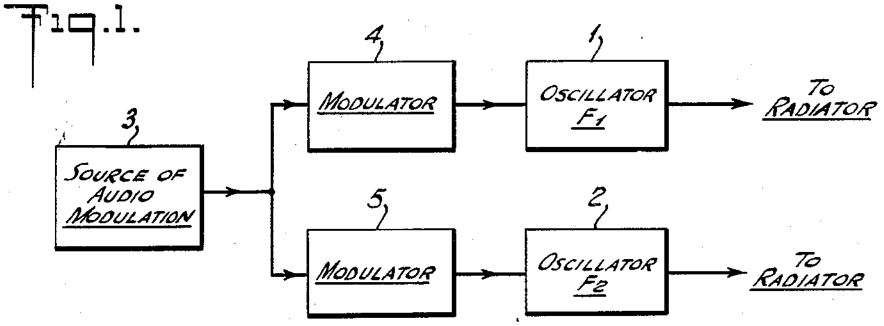

My present invention relates generally to systems for reducing selective fading distortion. This application is a division of my copending application Serial No. 503,465, filed September 22, 1943, now Patent No. 2,413,543, granted December 31, 1946.

In areas fairly distant from standard broadcast stations (530–1700 kilocycle broadcast band) distortion occurs by virtue of the well-known phenomenon known as "selective fading." Distortion of this type is actually a distortion of audio frequency modulation due to interference of sky and ground waves at a particular signal wave collector of a receiver. Selective fading distortion is, also, encountered on the frequency bands higher than the broadcast frequency range.

One important object of my invention is to provide means for automatically rejecting a distorted signal and to select an undistorted signal.

Another important object of this invention is to provide a novel method of reducing selective fading distortion in receivers, wherein common audio frequency modulation signals are transmitted on adjacent channel carriers, the reception of such adjacent channel carriers being carried out in a system having a pass band wide enough to pass both carriers up to the demodulator whereby when one carrier fades substantially below the strength of the other carrier, then the efficiency of rectification is reduced for the fading carrier and the audio frequency output from the fading signal is abnormally reduced.

Still another important object of my invention is to provide a method of reducing distortion due to selective fading which is based on the observed phenomenon that at any given reception point where sky and ground waves from a given transmitter are of the same order of magnitude, combining these waves in two different phase relations will cause one of the resulting waves to be undistorted and strong while the other is distorted and weak. The method employed involves conversion of the two waves into two different intermediate frequency waves, and passing them through a wide transmission path to a detector, or to employ separate detectors for the two waves with means for increasing the difference in amplitudes of the signals impressed on the detectors.

A more specific object of one form of this invention is to provide a broadcast receiver with a pair of loops which are oriented so as to have their planes at right angles to each other; each of the loops feeding separate converter networks so as to provide intermediate frequencies located on adjacent frequency channels but having common modulation signals thereon, the demodulator of the system having a common transmission path from the pair of parallel intermediate frequency networks thereof, and which common path has a pass band which is sufficiently wide to pass each intermediate frequency with its modulation side bands.

Still other objects of my invention are to improve generally the efficiency and reliability of systems for reducing distortion accompanying selective fading, and more especially to provide methods of reducing selective fading distortion which are economical so far as apparatus is concerned.

Other objects of my invention will best be understood by reference to the following description taken in connection with the drawing in which I have indicated diagrammatically a system whereby my invention may be carried into effect.

Figure 2:
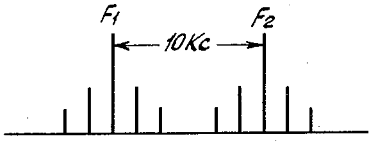
Figure 3:
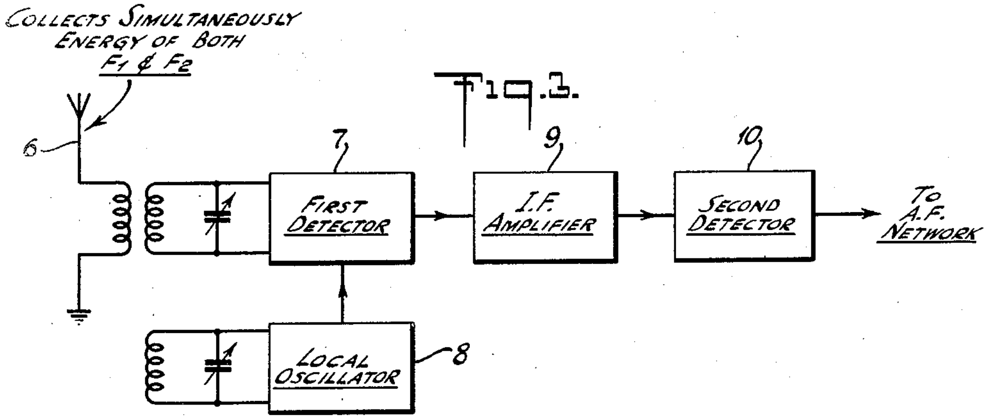
Figure 4:
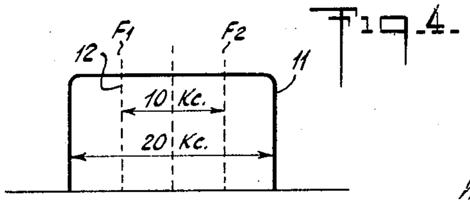

In the drawing:

Fig. 1 schematically shows a transmitter system adapted to radiate a pair of adjacent channel carriers of common modulation;

Fig. 2 shows in a diagrammatic manner the modulated carrier radiated by the system of Fig. 1;

Fig. 3 schematically shows a receiver adapted to receive the radiated waves from the system of Fig. 1; and Fig. 4 shows the pass band curve of a receiver constructed in accordance with my invention.

Referring now to the accompanying drawing, wherein like reference characters in the different figures designate similar circuit elements, I have shown in Fig. 1 in purely schematic manner a transmission system adapted to be employed in one method of reducing distortion caused by selective fading. In this transmitter system a pair of master oscillators 1 and 2 is utilized. These oscillators are constructed and designed to produce oscillations having frequencies on adjacent frequency channels. Thus, oscillator 1 operates at frequency $F_1$ whereas oscillator 2 operates at a frequency $F_2$. Assuming that the transmitter is producing modulated carrier waves in the standard broadcast band, it will be understood that $F_1$ and $F_2$ will be the carrier frequencies of immediately adjacent channels. These channels are normally spaced 10 kilocycles (kc.) apart.

The source of audio frequency modulation 3 is utilized concurrently or synchronously to modulate the oscillations produced by each of oscillators 1 and 2. Thus, the modulator 4 is employed to modulate the oscillations of oscillator 1 in accordance with the modulation signals of source 3. The modulator 5 is adapted to modulate the oscillations of oscillator 2 in accordance with the modulation signals of source 3. The separate modulated carrier energy of oscillators 1 and 2 may then be transmitted to one or more separate stages of amplification, and finally the separate modulated carrier waves are radiated from separate radiators. There is shown in Fig. 2 in purely illustrative manner the relation which exists between the amplitude modulated carrier waves which are radiated from the separate radiators of the system of Fig. 1. It will be seen that there is a 10 kc. spacing between the carrier frequencies $F_1$ and $F_2$ (represented by the two longest vertical lines), whereas the modulation side band components (represented by the shorter vertical lines) are exactly the same for both carrier frequencies.

At the receiver, which is schematically represented in Fig. 3, there is shown a signal collector device 6 which may be the usual grounded antenna circuit. The receiving system is represented as being of the superheterodyne type, since the latter type of receiver is practically universally used to receive radio signals in the standard broadcast band. However, it is to be clearly understood that any other type of receiver, such as one of the tuned radio frequency amplifier type, or the super-regenerative type, may be employed.

Assuming that the receiving system is of the superheterodyne type, there is employed the usual first detector or converter 7 which has a tunable input circuit so that the receiver may be tuned to frequencies $F_1$ and $F_2$. The usual local oscillator 8 is also tunable, and the locally produced oscillations of a predetermined frequency are applied to the first detector 7. In the output of the latter there is produced the intermediate frequency (I. F.) energy, which may be amplified by one or more stages of I. F. amplification 9. The amplified I. F. energy may then be applied to a second detector or demodulator 10 whose input is tuned to the operating I. F. value. The modulation output of the second detector 10 may then be transmitted through one or more stages of audio frequency amplification, and the amplified audio energy is then reproduced in any desired form of reproducer such as a loudspeaker.

It will be recognized that the aforedescribed networks of the receiver of Fig. 3 are purely conventional. Indeed, my invention is readily applied to any conventional receiver of the standard broadcast type. The only change that need be made in the conventional superheterodyne receiver is that the pass band characteristic of the receiver up to the input terminals of the second detector 10 be sufficiently wide so as to pass the energy of carriers $F_1$ and $F_2$ and their associated modulation side bands. In Fig. 4 I have shown an illustrative representation of the type of transmission characteristic which the receiving system of Fig. 3 should have. The full line curve 11 denotes the ideal transmission characteristic of the receiver up to the input terminals of the second detector. It will be noted that the pass band width is 20 kc. This means that the radiated carriers $F_1$ and $F_2$ and their modulation side bands may readily be passed through the various networks from the signal collector 6 to the input terminals of the demodulator 10. The dotted lines 12 in Fig. 4 show the positions of the carrier $F_1$ and $F_2$ and the 10 kc. spacing between each of the carriers $F_1$ and $F_2$ and their modulation side bands. In designing the receiving system in Fig. 3 it is to be understood that each of the selector transmission networks from the signal collector 6 to the input terminals of demodulator 10 should have a pass band width which will be sufficiently wide to pass a radio frequency band 20 kc. wide.

The demodulator 10 may be of any well-known form. That is to say, it can be a diode detector, a grid leak rectification type of detector, or a plate circuit rectification form of detector. It is a well known fact that with such detectors the stronger of two signals will dominate, and that the weaker signal will appear in the detector output only as frequencies resulting from the heterodyne beat from reaction with the stronger carrier. These beats will in this case all be of frequencies above 5000 cycles, and, therefore, will be outside the pass band of the audio system employed. As one signal intensity falls, the detector efficiency falls at a rapid rate. This has the significance that when one of the signals $F_1$ or $F_2$ falls substantially below the strength of the other signal, then the efficiency of rectification is reduced for the fading signal and the audio frequency output derived from the fading signal is abnormally reduced. It will now be appreciated that a simple and effective manner of reducing distortion caused by selective fading is readily provided by my invention. Let it be assumed that the receiver of Fig. 3 is located at such a distance from the transmitter of Fig. 1 that severe selective fading occurs in that receiving locality.

If the ground wave and sky wave of carrier $F_1$ cancel at the position where collector 6 is located, it is most unlikely that the same cancellation will occur for carrier $F_2$. Indeed, actual observation demonstrates that simultaneous selective fading of adjacent carriers is most improbable. Hence, if, for example, carrier $F_1$ should fade sufficiently so that detection thereof at the demodulator 10 would cause audio distortion, with my invention such audio distortion will be greatly reduced and even substantially eliminated. This follows from the fact that when the carrier $F_1$ fades severely relative to its modulation side bands, the rectification efficiency of demodulator 10 will drop very rapidly and the audio output due to the carrier $F_1$ will substantially disappear. However, since the network which feeds the demodulator is sufficiently broad to pass the carrier $F_2$, it follows that the audio output reaching the loudspeaker will be sufficient because the audio output due to $F_2$ is the same audio output which would have been derived from $F_1$. It is emphasized that since $F_2$ is not fading relative to its modulation side bands, the detector efficiency with respect to the modulated carrier wave $F_2$ will be at a high value and unaffected by the reduction of the detector efficiency with respect to the wave $F_1$.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In a radio signalling system wherein a plurality of radio carrier waves having different frequencies in adjacent channels are modulated by the same intelligence signals and are simultaneously transmitted, a receiver for said carrier waves, comprising carrier wave amplifying means having a frequency pass band substantially equal to the combined band width of said plurality of adjacent channels, and a single carrier wave demodulator coupled to said amplifying means and having a responsive band width substantially equal to the combined band width of said plurality of adjacent channels.

2. A radio signalling system as defined in claim 1, in which said carrier wave amplifying means includes frequency changing means to convert the received carrier waves of radio frequencies into carrier waves of fixed intermediate frequencies having a band width substantially equal to the combined band width of said plurality of adjacent channels.

3. A radio signalling system as defined in claim 2, in which said amplifying means includes an intermediate frequency amplifier having a frequency pass band substantially equal to the combined band width of said plurality of adjacent channels, and said demodulator is coupled to said intermediate frequency amplifier.

WENDELL L. CARLSON.

REFERENCES CITED

The following references are of record in the file of this patent:

UNITED STATES PATENTS

| Number | Name | Date |
|---|---|---|
| 1,472,218 | Hammond | Oct. 30, 1923 |
| 1,758,940 | Gage | May 20, 1930 |
| 1,766,050 | Young | June 24, 1930 |
| 1,836,594 | Heising | Dec. 15, 1931 |
| 1,915,578 | Osnos | June 27, 1933 |
| 2,067,432 | Beverage | Jan. 12, 1937 |
| 2,080,281 | Koch | May 11, 1937 |
| 2,148,267 | Honare | Feb. 21, 1939 |
| 2,253,853 | Haantjes et al. | Aug. 26, 1941 |
| 2,273,640 | Haantjes et al. | Feb. 17, 1942 |
| 2,303,493 | Purington | Dec. 1, 1942 |
| 2,350,702 | Ulrich | June 6, 1944 |
| 2,400,133 | Pray | May 14, 1946 |
| 2,409,208 | Holst et al. | Oct. 15, 1946 |
| 2,429,504 | Ziegler | Oct. 21, 1947 |
| 2,455,657 | Cork et al. | Dec. 7, 1948 |

FOREIGN PATENTS

| Number | Country | Date |
|---|---|---|
| 301,326 | Great Britain | Mar. 28, 1929 |